(12) United States Patent
Taylor (10) Patent No.: US 6,573,764 B1
(45) Date of Patent: Jun. 3, 2003

(54) METHOD AND APPARATUS FOR VOLTAGE-MODE DIFFERENTIAL SIMULTANEOUS BI-DIRECTIONAL SIGNALING

(75) Inventor: Gregory F. Taylor, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/963,037

(22) Filed: Sep. 24, 2001

(51) Int. Cl.[7] .......................................... H03K 19/0175
(52) U.S. Cl. ............................ 327/108; 326/86; 326/82
(58) Field of Search ................................ 327/108, 362, 327/317, 319; 326/86, 60, 82, 83

(56) References Cited

U.S. PATENT DOCUMENTS

| | | | |
|---|---|---|---|
| 4,573,168 A | * 2/1986 | Henze et al. | 330/255 |
| 6,124,727 A | * 9/2000 | Bridgewater, Jr. et al. | 326/86 |
| 6,242,950 B1 | 6/2001 | Bozso et al. | 326/86 |
| 6,300,795 B1 | 10/2001 | Kirsch et al. | 326/60 |
| 6,304,106 B1 | * 10/2001 | Cecchi et al. | 326/86 |
| 6,307,543 B1 | 10/2001 | Martin | 345/213 |
| 6,329,843 B1 | * 12/2001 | Hirata et al. | 326/82 |

* cited by examiner

Primary Examiner—Dinh T. Le
(74) Attorney, Agent, or Firm—Blakely, Sokoloff, Taylor & Zafman LLP (57) ABSTRACT

A driver/receiver circuit for use at one end of a simultaneous bi-directional differential signal line while being driven at the other end by a similar circuit. The driver/receiver circuit includes a differential driver, a differential receiver, an isolation circuit and an offset generator. The differential driver drives differential signal lines as a function of an output signal. The differential amplifier detects the differential voltage across the differential signal lines via the isolation circuit. The offset generator circuit receives the output signal and, in response, adds an offset to the input terminals of the differential amplifier. The offset cancels at least a portion of the differential voltage across the input terminals of the differential amplifier that results from the DOUT signal. The isolation circuit prevents the offset from significantly affecting the voltage across the differential signal lines.

32 Claims, 7 Drawing Sheets

METHOD AND APPARATUS FOR VOLTAGE-MODE DIFFERENTIAL SIMULTANEOUS BI-DIRECTIONAL SIGNALING

TECHNICAL FIELD

This disclosure relates generally to electronic circuits, and in particular but not exclusively, relates to electronic circuits used in differential bi-directional signaling.

BACKGROUND

A typical integrated circuit (chip) includes input circuits to receive signals from other parts of the chip or from circuitry external to the chip (e.g., via the pins of the chip). The input circuits output the received signals with "restored" voltage levels and appropriate driving current to other parts of the chip. As is well known, a variety of sources may inject noise into the signal received by the input circuit. For example, sources include ringing caused by mismatched output drivers or interconnect impedance, signal cross coupling, and power supply noise. These sources can cause common mode noise that can cause an input circuit to improperly output the received signal.

One conventional solution to this common mode noise problem is to use differential signals. However, the conductive lines used to propagate the signals occupy valuable area in the chip. In addition, chips typically have a limited number of pins available for receiving external signals. These problems apply to single-ended signals as well, but are exacerbated when differential signals are used because of the dual lines needed for each differential signal.

BRIEF DESCRIPTION OF THE DRAWINGS

Non-limiting and non-exhaustive embodiments of the present invention are described with reference to the following Figures, wherein like reference numerals refer to like parts throughout the various views unless otherwise specified.

DETAILED DESCRIPTION OF THE ILLUSTRATED EMBODIMENTS

Embodiments of a circuit and method for differential bi-directional signaling are described herein. In the following description, numerous specific details are set forth (such as, for example, the components/functional units of a microprocessor) to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In one aspect of the present invention, a driver/receiver circuit for use in differential bi-directional signaling includes a differential driver, a differential amplifier, an isolation circuit, and an offset generator circuit. The driver/receiver circuit receives a single-ended output signal (DOUT) and drives a pair of differential signal lines with a voltage as a function of the DOUT signal at the same time an identical driver/receiver circuit is driving the differential signal lines as a function of a data input signal DIN. The differential amplifier detects the differential voltage across the differential signal lines via the isolation circuit.

In accordance with this aspect, the offset generator circuit also receives the DOUT signal and, in response thereto, adds an offset to the input terminals of the differential amplifier. The offset approximately cancels the differential voltage across the input terminals of the differential amplifier that results from the DOUT signal. The isolation circuit prevents the offset from significantly affecting the voltage across the differential signal lines.

The present invention is described below in the context of a bus input circuit of a microprocessor; however, in light of the present disclosure, those of ordinary skill in the art will understand that the methods and apparatus of the present invention are generally applicable to input circuits for signals other than bus signals and to IC devices other than microprocessors.

Figure 1:
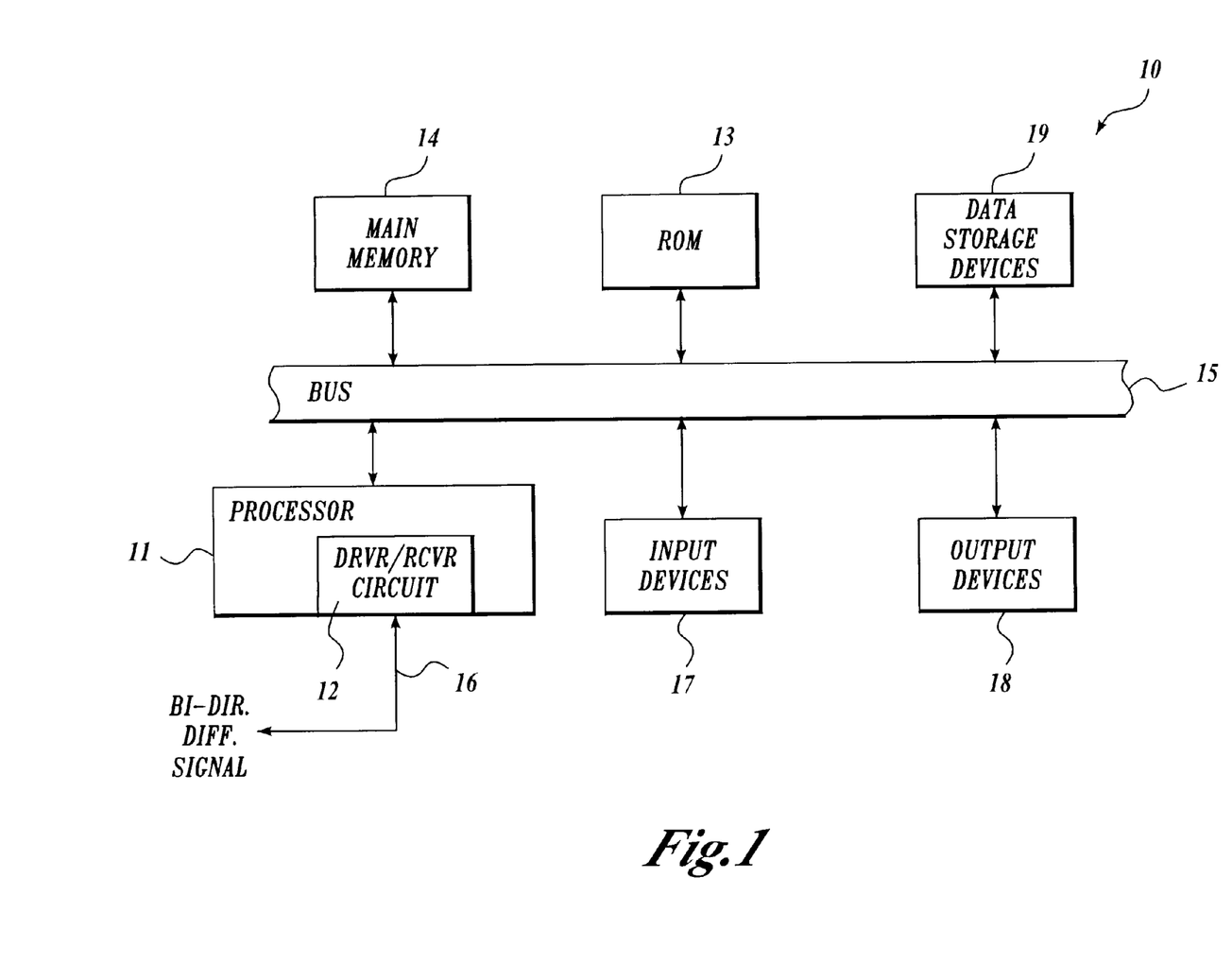
FIG. 1 is a block diagram illustrating a computer system incorporating an input circuit according to one embodiment of the present invention.

Shown schematically in FIG. 1 is a computer system 10 incorporating a processor 11 with a driver/receiver circuit 12 according to the present invention. This embodiment of computer system 10 also includes a read only memory (ROM) 13, a main memory 14, a bus 15, one or more input devices 17, one or more output devices 18 and one or more data storage devices 19. In this exemplary embodiment, driver/receiver circuit 12 is connected to receive a differential bi-directional signal from an external driver/receiver circuit (not shown) essentially the same as driver/receiver circuit 12. In accordance with the present invention, processor 11 can have a large number of driver/receiver circuits identical to driver/receiver circuit 12 connected to receive other differential bi-directional signals from within or external to processor 11. Various embodiments of driver/receiver circuit 12 are described below in conjunction with FIGS. 3–8.

Processor 11 is coupled via bus 15 to main memory 14, which may include one or more dynamic random access memory (DRAM) devices for storing information and instructions to be executed by processor 11. Main memory 14 may also be used for storing temporary variables or other intermediate information during execution of instructions by processor 11. ROM 13, for storing static information and instructions for processor 11, is coupled to processor 11 via bus 15.

Input devices 17, such as a keyboard or mouse, are coupled to processor 11 through bus 15. Output devices 18 are also coupled to processor 11 via bus 15. Typical output devices 18 include printers and display monitors. Storage devices 19 are also coupled to processor 11 via bus 15. Common data storage devices include hard disk drives, floppy disk drives, and CD ROM drives. In light of this disclosure, those of ordinary skill in the art will understand that computer system 10 may include other components and subsystems in addition to those shown and described with respect to FIG. 1. By way of example, computer system 10 may include video memory, cache memory, as well as other dedicated memory, and additional signal lines and busses.

Figure 2:
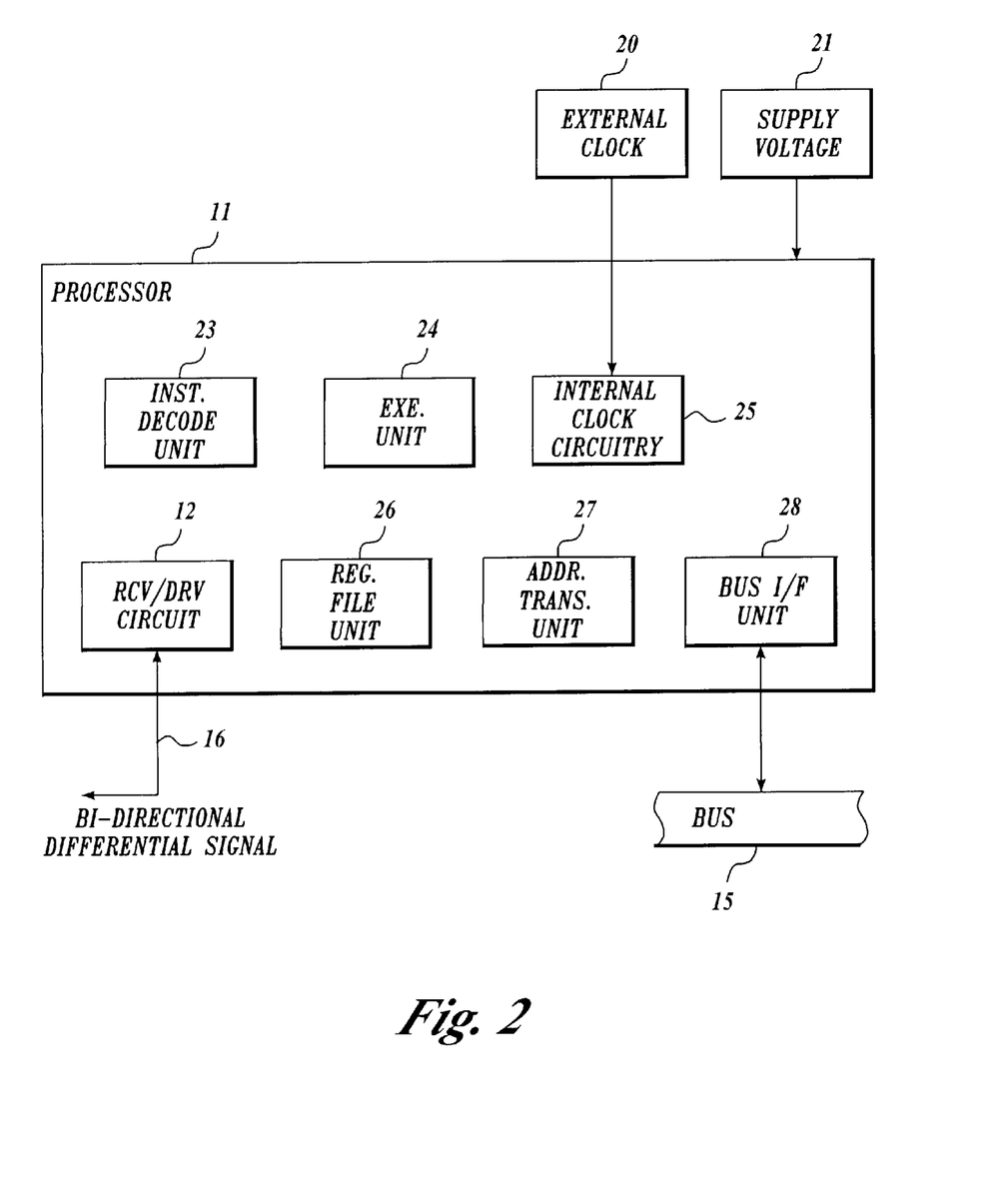
FIG. 2 is a block diagram illustrating the processor of FIG. 1, according to one embodiment of the present invention.

FIG. 2 illustrates an embodiment of processor 11 (FIG. 1), which is coupled to external clock 20 and a supply voltage source 21. In one embodiment, supply voltage source 21 provides a supply voltage VCC to processor 11. This embodiment of processor 11 includes an instruction decoder unit 23, an execution unit 24, internal clock circuitry 25, register file unit 26, address translation unit 27 and bus interface unit 28.

The embodiment of processor 11 presented in FIG. 2 is illustrative. In light of this disclosure, those of ordinary skill in the art will understand that, in practice, a modern processor is generally more complex and may include additional components, such as internal cache, which have been omitted for ease of understanding. To improve clarity, FIG. 2 does not show internal buses and other communication paths that electrically interconnect internal clock circuitry 25 and various functional units of processor 11 (e.g., instruction decode unit 23, execution unit 24, register file unit 26, address translation unit 27, and bus interface unit 28). Accordingly, processor 11 is presented without limitation, and the present invention is generally applicable to all types of processors (e.g., microprocessors, microcontrollers, digital signal processors, etc.), irrespective of the specific architecture employed.

Driver/receiver circuit 12 can be used to receive and to drive signals to external circuits, as shown in FIG. 2. For example, driver/receiver circuit 12 may be connected to a pair of pins of processor 11, which would be connectable to a similar driver/receiver circuit (not shown) in another chip. In addition, FIG. 2 does not show other driver/receiver circuits substantially similar to driver/receiver circuit 12 that may be used to receive other signals.

Bus interface unit 28 is coupled to bus 15, as well as main memory 14 and ROM 13 (not shown). Bus interface unit 28 facilitates transmission of data between main memory 14 and processor 11, and performs fetching of instructions and other data from ROM 13. Address translation unit 27 performs memory management for processor 11. Specifically, address translation unit stores the memory addresses (whether in main memory 14, internal cache, or other memory) of data being used by processor 11 during operation. Instruction decoder unit 23 decodes instructions and other control signals received by processor 11.

Execution unit 24 is intended to present a broad category of microprocessor functional units providing a wide range of functions. By way of example, execution unit 24 may include an arithmetic and logic unit for performing arithmetic operations such as shifts, addition, subtraction, multiplication, and division. Register file unit 26 may include one or more types of registers for storing data used by processor 11. For example, register file unit 26 may include integer registers, status registers, instruction pointer registers, and floating point registers, as well as other registers. If present, the internal cache (not shown) may be used, for example, to store data and control signals from main memory 14.

External clock 20 provides a clock signal having an external clock frequency to internal clock circuitry 25. Internal clock circuitry 25, which may comprise a phase lock loop (PLL) circuit, adjusts the external clock frequency (either increasing or decreasing this frequency) to achieve a desired operating frequency for processor 11.

Figure 3:
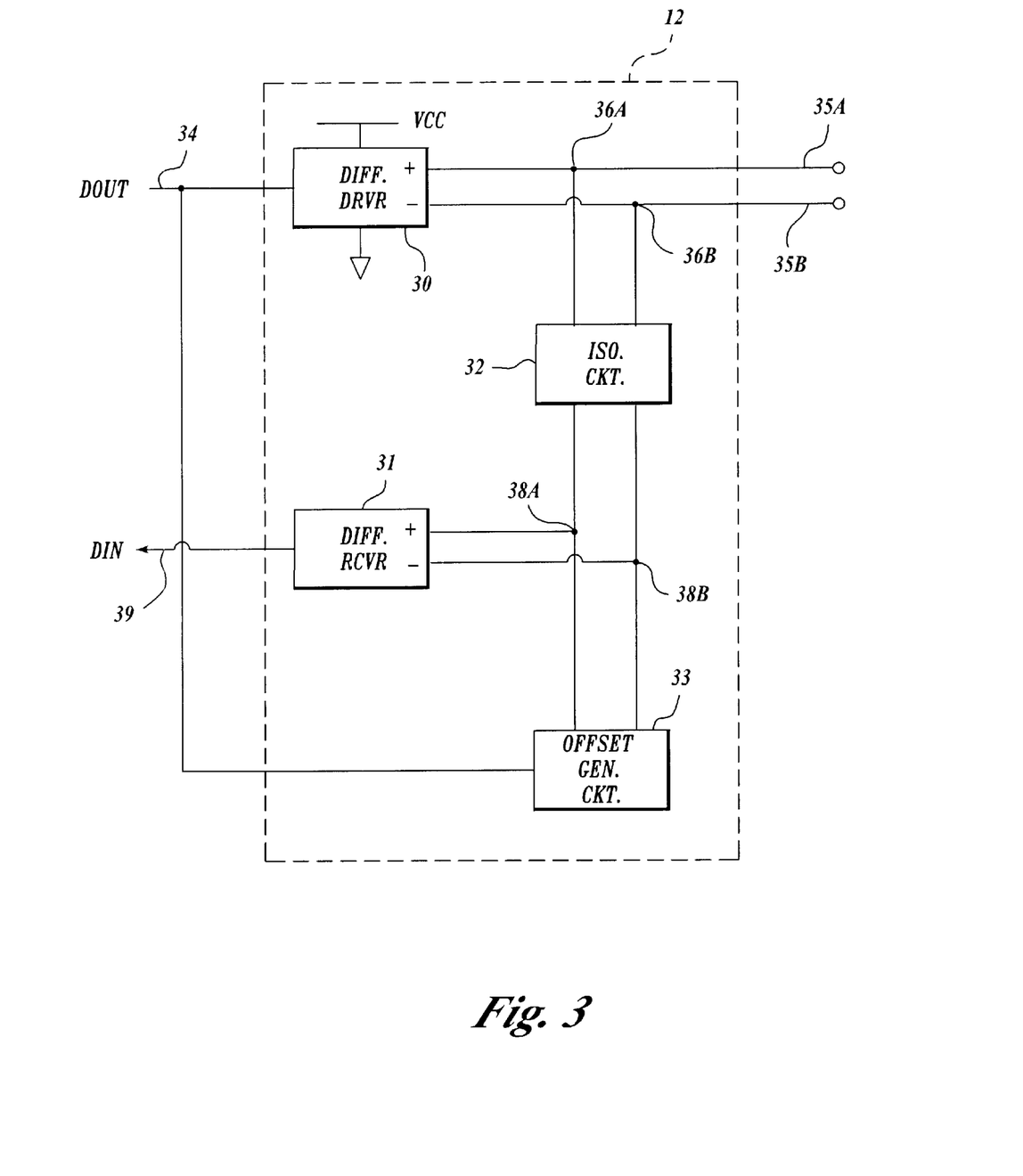
FIG. 3 is a block diagram illustrating a driver/receiver circuit according to one embodiment of the present invention.

FIG. 3 illustrates driver/receiver circuit 12 (FIG. 2), according to one embodiment of the present invention. In accordance with the present invention, driver/receiver circuit 12 is part of a voltage-mode differential simultaneous bi-directional signaling system. That is, this voltage-mode differential signaling system supports simultaneous signaling in both directions of a pair of differential signal lines. Omitted for clarity, an essentially identical driver/receiver circuit is connected to the output leads of driver/receiver circuit 12 through a pair of transmission lines (also referred to herein as differential signal lines). The pair of transmission lines may include input/output pins for propagating bi-directional signals off-chip. This system advantageously provides the noise rejection of differential signaling systems along with the increased bandwidth of bi-directional signaling systems.

In this embodiment, driver/receiver circuit 12 includes a differential driver 30, a differential receiver 31, an isolation circuit 32, and an offset generator circuit 33. In one embodiment, differential driver 30 has an impedance that is matched to the transmission lines (typically fifty ohms).

The elements of driver/receiver circuit 12 are interconnected as follows. Differential driver 30 is connected to receive a single-ended output signal DOUT via a line 34 to drive onto transmission lines 35A and 35B as a differential signal. In this embodiment, transmission lines 35A and 35B respectively carry the "positive" and "negative" signals forming the differential signal. One port of isolation circuit 32 is connected to transmission lines 35A and 35B at nodes 36A and 36B. Another port of isolation circuit 32 is connected to internal nodes 38A and 38B. Differential receiver 31 has its differential input terminals connected to internal nodes 38A and 38B. In this embodiment, the positive and negative terminals are connected to internal nodes 38A and 38B, respectively. Differential receiver 31 outputs a single-ended input signal (DIN) onto a line 39 with dependence on the differential signal present on transmission lines 35A and 35B. In operation, input signal DIN is the "output" signal of the other driver/receiver circuit at the other end of transmission lines 35A and 35B. Offset generator circuit 33 has an input lead connected to receive output signal DOUT via line 34 and has output leads connected to internal nodes 38A and 38B.

Figure 4:
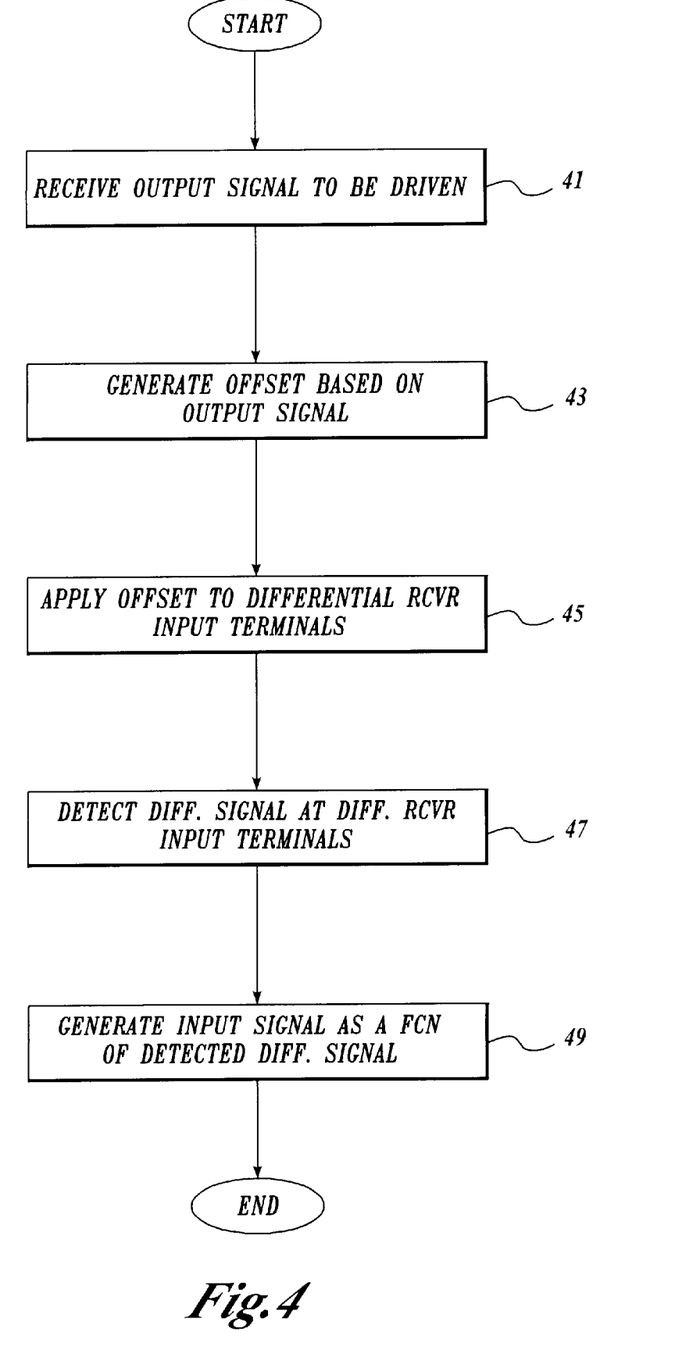
FIG. 4 is a flow diagram illustrating the operation of the driver/receiver circuit depicted in FIG. 3, according to one embodiment of the present invention.

Referring to both FIG. 3 and the flow diagram of FIG. 4, driver/receiver circuit 12 operates as follows. In this embodiment, differential driver 30 receives a single-ended output signal DOUT via line 34 and drives a differential output signal onto transmission lines 35A and 35B as a function of the voltage level of output signal DOUT. In this embodiment, differential driver 30 attempts to drive transmission line 35A with the same logic level as output signal DOUT, and transmission line 35B with the complement.

Although differential driver 30 is driving output signal DOUT onto transmission lines 35A and 35B, the voltage levels at transmission lines 35A and 35B also depend on the operation of the driver/receiver circuit (not shown) at the other end of the transmission lines. Table 1 below indicates, from the point of view of driver/receiver circuit 12, the voltage levels present on transmission lines 35A and 35B for various values of signals DOUT and DIN. As previously mentioned, input signal DIN is the "output" signal of the driver/receiver circuit (not shown) at the other end of transmission lines 35A and 35B. This operation is represented in a block 41 of FIG. 4.

TABLE 1

| DOUT | DIN | $V_{LINE\ 35A}$ | $V_{LINE\ 35B}$ |
| --- | --- | --- | --- |
| 0 | 0 | 0 | VCC |
| 0 | 1 | ½VCC | ½VCC |
| 1 | 0 | ½VCC | ½VCC |
| 1 | 1 | VCC | 0 |

The voltage levels of internal nodes 38A and 38B are essentially equal to the that of transmission lines 35A and 35B, less any voltage drops across isolation circuit 32. In accordance with the present invention, offset generator circuit 33 generates an offset voltage in response to the logic level of output signal DOUT (one embodiment of offset generator circuit 33 is described below in conjunction with FIG. 6). In one embodiment, offset generator circuit 33 controls the voltage drop caused by isolation circuit 32 to achieve the desired offset voltage. Offset generator circuit 33 generates the offset voltage to offset (i.e., in the opposite "direction" of) the voltage generated by differential driver 30. More particularly, in this embodiment, if output signal DOUT has a logic zero level, offset generator circuit 33 generates the offset voltage to increase the voltage at internal node 38A. In addition, offset generator circuit 33 can simultaneously decrease the voltage at node 38B. In one embodiment, offset generator circuit 33 generates an offset voltage of –½VCC at node 38B, in another it generates an offset of +¼VCC at node 38A while generating an offset of –¼VCC at node 38B, although in other embodiments the magnitude of the offset voltage can be between –½VCC and +½VCC.

Conversely, if output signal DOUT has a logic one level, offset generator circuit 33 generates the offset voltage to decrease the voltage at internal node 38A. In addition, offset generator circuit 33 can also simultaneously increase the voltage at internal node 38B. This operation is represented as a block 43 in FIG. 4.

Offset generator circuit 33 applies the offset voltage to internal nodes 38A and 38B. Isolation circuit 32 helps prevent the voltage offset from affecting the voltages at transmission lines 35A and 35B (one embodiment of isolation circuit 32 is described in more detail below in conjunction with FIG. 5). As a result, the offset voltage at least partially cancels the contribution of differential driver 30 to the voltage levels at internal nodes 38A and 38B. Due to the canceling effect of the offset voltage, the differential signal at internal nodes 38A and 38B is predominately representative of differential signal driven by the driver/receiver circuit at the other end of transmission lines 35A and 35B. Thus, the differential signal at internal nodes 38A and 38B represents input signal DIN (with regard to driver/receiver circuit 12). This operation is represented as a block 45 of FIG. 4.

Differential receiver 31 detects the differential voltage at internal nodes 38A and 38B and generates in response thereto single-ended out signal DIN onto line 39. In some embodiments, differential receiver 31 is implemented with standard comparator or a low-noise differential amplifier connected in an open-loop configuration. This operation is represented as blocks 47 and 49 of FIG. 4.

Figure 5:
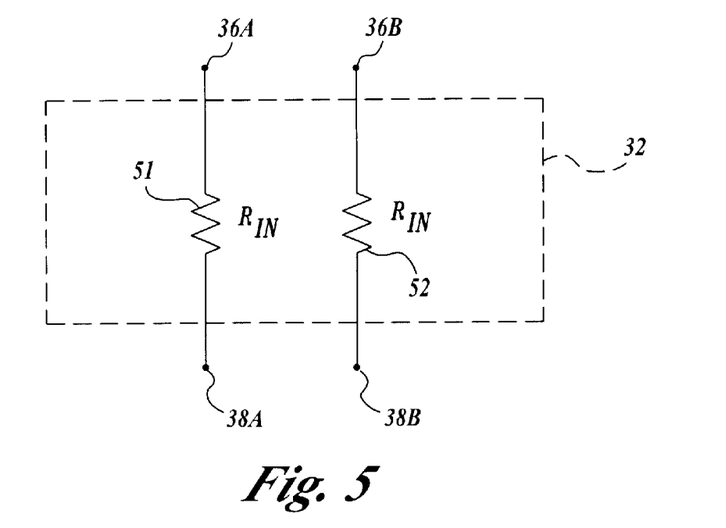
FIG. 5 is a diagram illustrating an implementation of the isolation circuit depicted in FIG. 3, according to one embodiment of the present invention.

FIG. 5 illustrates an implementation of isolation circuit 32 (FIG. 3), according to one embodiment of the present invention. In some embodiments, isolation circuit 32 is implemented with a pair of resistors or other resistive elements. In this embodiment, a resistor 51 connected between nodes 36A and 38A, and a resistor 52 connected between nodes 36B and 38B. Resistors 51 and 52 each have a resistance $R_{IN}$ of about 200 Ω. Ideally, these resistances are matched. In one embodiment, resistors 51 and 52 are also used for electrostatic discharge (ESD) protection of driver/receiver circuit 12 (FIG. 3). Isolation circuit 32 may be implemented differently in other embodiments, for example using the resistance of FETs configured as pass devices connecting nodes 35A and 35B to nodes 38A and 38B.

Figure 6:
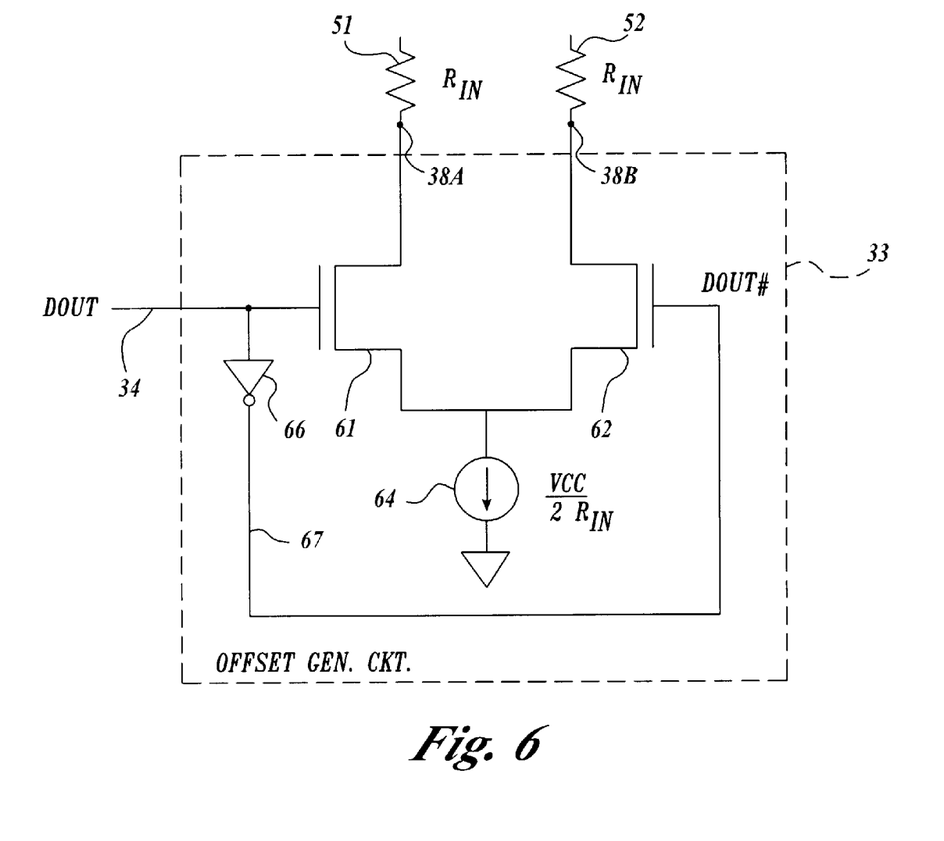
FIG. 6 is a schematic diagram illustrating an implementation of the offset generator circuit depicted in FIG. 3, according to one embodiment of the present invention.

FIG. 6 schematically illustrates an implementation of offset generator circuit 33 (FIG. 3), according to one embodiment of the present invention. This embodiment includes a source-coupled pair of N-channel transistors 61 and 62, a current source 64, and an inverter 66.

Current source 64 is connected to the common source node of N-channel transistors 61 and 62. In this embodiment, current source 64 is configured to conduct a constant current of $VCC/(2R_{IN})$ from the common source node to ground. The drains of N-channel transistors 61 and 62 are connected to internal nodes 38A and 38B, respectively. The gate of N-channel transistor 61 is connected to line 34 to receive output signal DOUT. The gate of N-channel transistor 62 is connected to receive the complement of output signal DOUT (i.e., signal DOUT#). In this embodiment, inverter 66 has its input lead connected to line 34 and has an output lead 67 connected to the gate of N-channel transistor 62. Thus, inverter 66 outputs signal DOUT#.

In operation, output signal DOUT will steer the current conducted by source-coupled transistors 61 and 62 so that one of these transistors will conduct essentially all of the current provided by current source 64. The current conducted by current source 64 is relatively low so that, in conjunction with resistors 51 and 52 of isolation circuit 32 (FIG. 3), the desired voltage offset is achieve without significantly affecting the voltages at transmission lines 35A and 35B.

For example, if the level of output signal DOUT is at a logic one level, then N-channel transistor 61 will be turned on and N-channel transistor 62 will be turned off. Thus, N-channel transistor 61 conducts a current of about $VCC/2R_{IN}$ from internal node 38A, while substantially no current is conducted by N-channel transistor 62 from internal node 38B. As a result, resistor 51 has a voltage drop of about ½VCC. Consequently, the voltage at internal node 38A can be about ½VCC (if input signal DIN is being driven onto transmission lines 35A and 35B by the other driver/receiver to a logic one level) or about zero (if input signal DIN is being driven by the other driver/receiver circuit to a logic zero level). Because there is essentially no voltage drop across resistor 38B, the voltage at internal node 38B can be about VCC (if input signal DIN is being driven by the other driver/receiver to a logic one level) or about ½VCC (if input signal DIN is being driven by the other driver/receiver to a logic zero level).

Similarly, if the level of output signal DOUT is at a logic zero level, then N-channel transistor 62 will be turned on and N-channel transistor 61 will be turned off. Thus, N-channel transistor 62 conducts a current of about VCC/2R$_{IN}$ from internal node 38B, while substantially no current is conducted by N-channel transistor 61 from internal node 38A. As a result, resistor 52 has a voltage drop of about ½VCC. Consequently, the voltage at internal node 38B can be about ½VCC (if input signal DIN is being driven onto transmission lines 35A and 35B by the other driver/receiver to a logic one level) or about zero (if input signal DIN is being driven by the other driver/receiver circuit to a logic zero level). The voltage at internal node 38A can be about VCC (if input signal DIN is being driven by the other driver/receiver to a logic one level) or about ½VCC (if input signal DIN is being driven by the other driver/receiver to a logic zero level).

Accordingly, there is a voltage swing of about ½VCC at internal nodes 38A and 38B for the various combinations of input signal DIN and signal DOUT logic levels. Table 2 below indicates, from the point of view of driver/receiver circuit 12, the voltage levels present on transmission lines 35A and 35B and internal nodes 38A and 38B for various values of signals DOUT and DIN.

TABLE 2

| DOUT | DIN | V$_{LINE\ 35A}$ | V$_{LINE\ 35B}$ | V$_{NODE38A}$ | V$_{NODE38B}$ |
|---|---|---|---|---|---|
| 0 | 0 | 0 | VCC | 0 | ½VCC |
| 0 | 1 | ½VCC | ½VCC | ½VCC | 0 |
| 1 | 0 | ½VCC | ½VCC | 0 | ½VCC |
| 1 | 1 | VCC | 0 | ½VCC | 0 |

Figure 7:
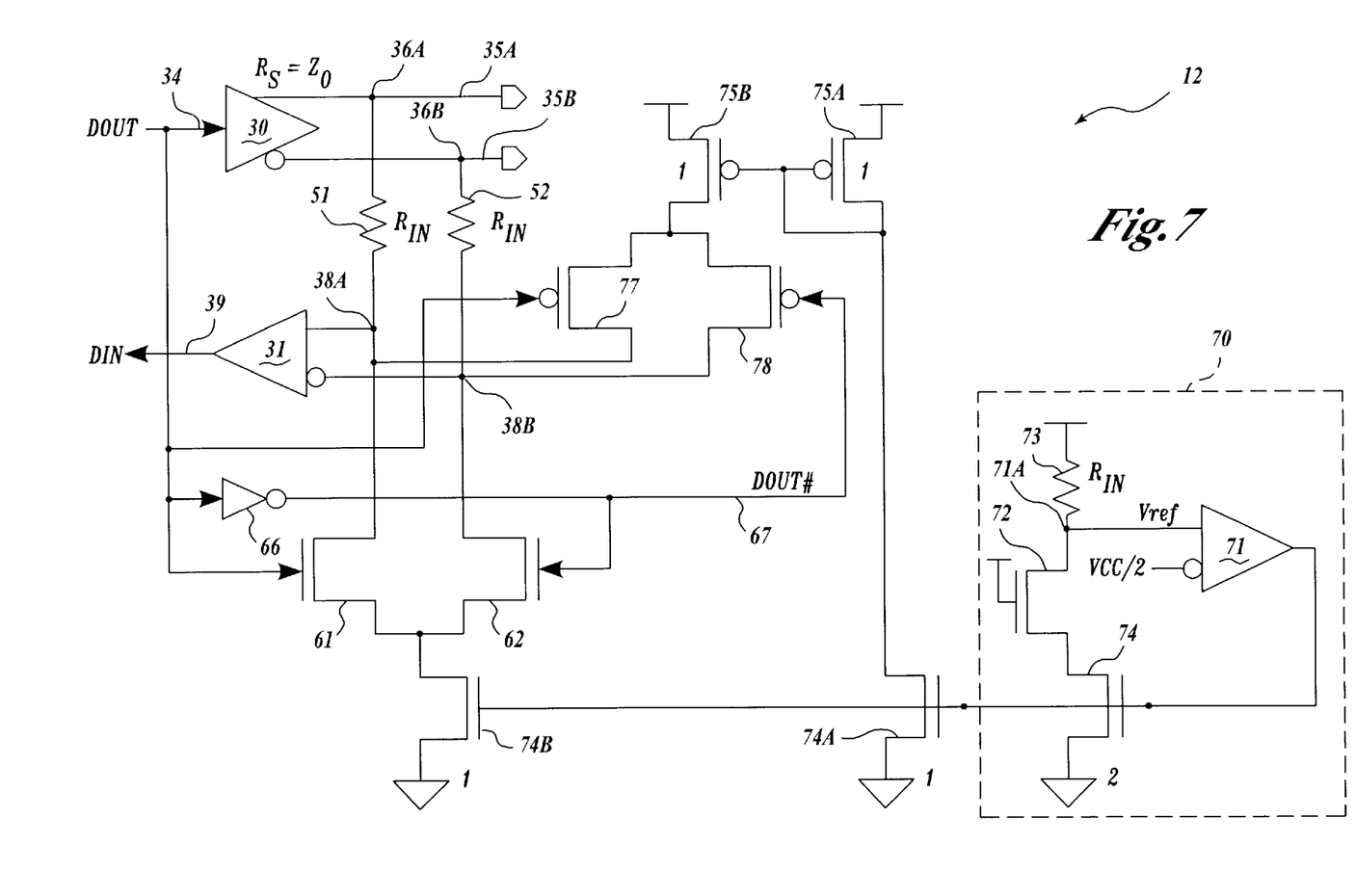
FIG. 7 is a schematic diagram illustrating a driver/receiver circuit, according to another embodiment of the present invention.

FIG. 7 schematically illustrates driver/receiver circuit 12 (FIG. 3), according to another embodiment of the present invention. In this embodiment, isolation circuit 32 (FIG. 3) includes resistors 51 and 52 (as described in conjunction with FIG. 5), and offset generator circuit 33 (FIG. 3) includes source-N-channel transistors 61 and 62 and inverter 66 (as described in conjunction with FIG. 6). These elements are interconnected as described in conjunction with FIG. 6, except as indicated below.

Offset generator circuit 33, in addition, includes the following elements: a reference generator 70 that includes a differential amplifier 71, a N-channel 72, a resistor 73 and another N-channel transistor 74 that forms the reference leg of a current mirror; a pair of current mirror outputs implemented by N-channel transistors 74A and 74B; another current mirror implemented using P-channel transistors 75A and 75B; and source-coupled P-channel transistors 77 and 78. These additional elements are interconnected as described below.

The elements of reference generator 70 are interconnected as follows. Resistor 73 is connected between the VCC line and the positive input lead of differential amplifier 71 via a node 71A. In this embodiment, resistor 73 has a resistance of R$_{IN}$, ideally matching resistors 51 and 52. The negative input lead of differential amplifier 71 is coupled to receive a reference voltage of ½VCC. In one embodiment, this reference voltage is generated using a voltage divider circuit (e.g., two resistors of equal value connected in series between the VCC and ground lines). N-channel transistor 72 has its drain, gate and source connected to node 71A, the VCC line and the drain of N-channel transistor 74, respectively. Thus, N-channel transistor is always turned on during normal operation, forming a current path between resistor 73 and N-channel transistor 74. N-channel transistor 74 has its gate and source respectively connected to an output lead of differential amplifier 71 and the ground line. Further, the gate of N-channel transistor 74 is connected to the gates of N-channel transistors 74A and 74B. N-channel transistor 74 is relatively large in this embodiment, ideally, twice the size of N-channel transistors 74A and 74B.

The elements of the N-channel current mirror are interconnected as follows. N-channel transistor 74A has its source and drain connected to the ground line and the drain of P-channel transistor 75A, respectively. N-channel transistor 74B has its source and drain connected to the ground line and the common source of N-channel transistors 61 and 62, respectively. N-channel transistor 74B serves as a current source replacing current source 64 (FIG. 6).

The elements of the P-channel current source are interconnected as follows. P-channel transistor 75A is diode-connected to conduct current from the VCC line to the drain of N-channel transistor 74A. P-channel transistor 75B has its source, gate and drain connected to the VCC line, the gate of P-channel transistor 75A, and the common-source of P-channel transistors 77 and 78, respectively. P-channel transistor 75B serves as a current source for source-coupled P-channel transistors 77 and 78.

In addition, P-channel transistor 77 has its drain and gate respectively connected to internal node 38A and to line 34 to receive signal DOUT. P-channel transistor 78 has its drain and gate respectively connected to internal node 38B and to line 67 to receive signal DOUT#.

This embodiment of driver/receiver circuit 12 operates as follows. Reference generator 70 operates in closed loop to maintain the voltage at node 71A at ½VCC. That is, reference generator 70 adjusts the gate voltage of N-channel transistor 74 so that N-channel transistor 74 conducts the current needed to produce a ½VCC voltage drop across resistor 73. This current is ideally equal to VCC/2R$_{IN}$.

The current conducted by N-channel transistor 74 is mirrored (scaled by ½) in N-channel transistors 74A and 74B. Thus, the N-channel and P-channel source-coupled pairs each, ideally, conduct half the current conducted by N-channel transistor 74; namely, VCC/4R$_{IN}$. Similar to the embodiment of FIG. 6, the current conducted by each source-coupled pair is steered through one transistor of the source-coupled pair as a function of output signal DOUT.

For example, if the level of output signal DOUT is at a logic one level, then transistors 61 and 78 will be turned on and transistors 62 and 77 will be turned off. Thus, N-channel transistor 61 conducts a current of about VCC/4R$_{IN}$ from internal node 38A, while P-channel transistor 78 conducts a current of about VCC/4R$_{IN}$ to internal node 38B. As a result, N-channel transistor 61 pulls down the voltage at internal node 38A by ¼VCC while P-channel transistor 78 pulls up the voltage at internal node 38B by ¼VCC. Consequently, if input signal DIN is a logic one level, the voltages at internal nodes 38A and 38B are about ¾VCC and ¼VCC, respectively. Conversely, if input signal DIN is being driven by the other driver/receiver circuit to a logic zero level, the voltages at internal nodes 38A and 38B are about ¼VCC and ¾VCC, respectively.

Similarly, if the level of output signal DOUT is at a logic zero level, then transistors 62 and 77 will be turned on and transistors 61 and 78 will be turned off. Thus, N-channel transistor 62 conducts a current of about VCC/4R$_{IN}$ from internal node 38B, while P-channel transistor 77 conducts a current of about VCC/4R$_{IN}$ to internal node 38A. As a result, N-channel transistor 62 pulls down the voltage at internal node 38B by ¼VCC while P-channel transistor 77 pulls up the voltage at internal node 38A by ¼VCC. Consequently, if input signal DIN is at a logic one level, the voltages at internal nodes 38A and 38B are about ¾VCC and ¼VCC, respectively. Conversely, if input signal DIN is at a logic zero level, the voltage at internal nodes 38A and 38B are about ¼VCC and ¾VCC, respectively.

Accordingly, there is a voltage swing of about ½VCC at internal nodes 38A and 38B for the various combinations of input signal DIN and signal DOUT logic levels. Table 3 below indicates, from the point of view of driver/receiver circuit 12, the voltage levels present on transmission lines 35A and 35B and internal nodes 38A and 38B for various values of signals DOUT and DIN.

TABLE 3

| DOUT | DIN | $V_{LINE\ 35A}$ | $V_{LINE\ 35B}$ | $V_{NODE\ 38A}$ | $V_{NODE\ 38B}$ |
| --- | --- | --- | --- | --- | --- |
| 0 | 0 | 0 | VCC | ¼VCC | ¾VCC |
| 0 | 1 | ½VCC | ½VCC | ¾VCC | ¼VCC |
| 1 | 0 | ½VCC | ½VCC | ¼VCC | ¾VCC |
| 1 | 1 | VCC | 0 | ¾VCC | ¼VCC |

Figure 8:
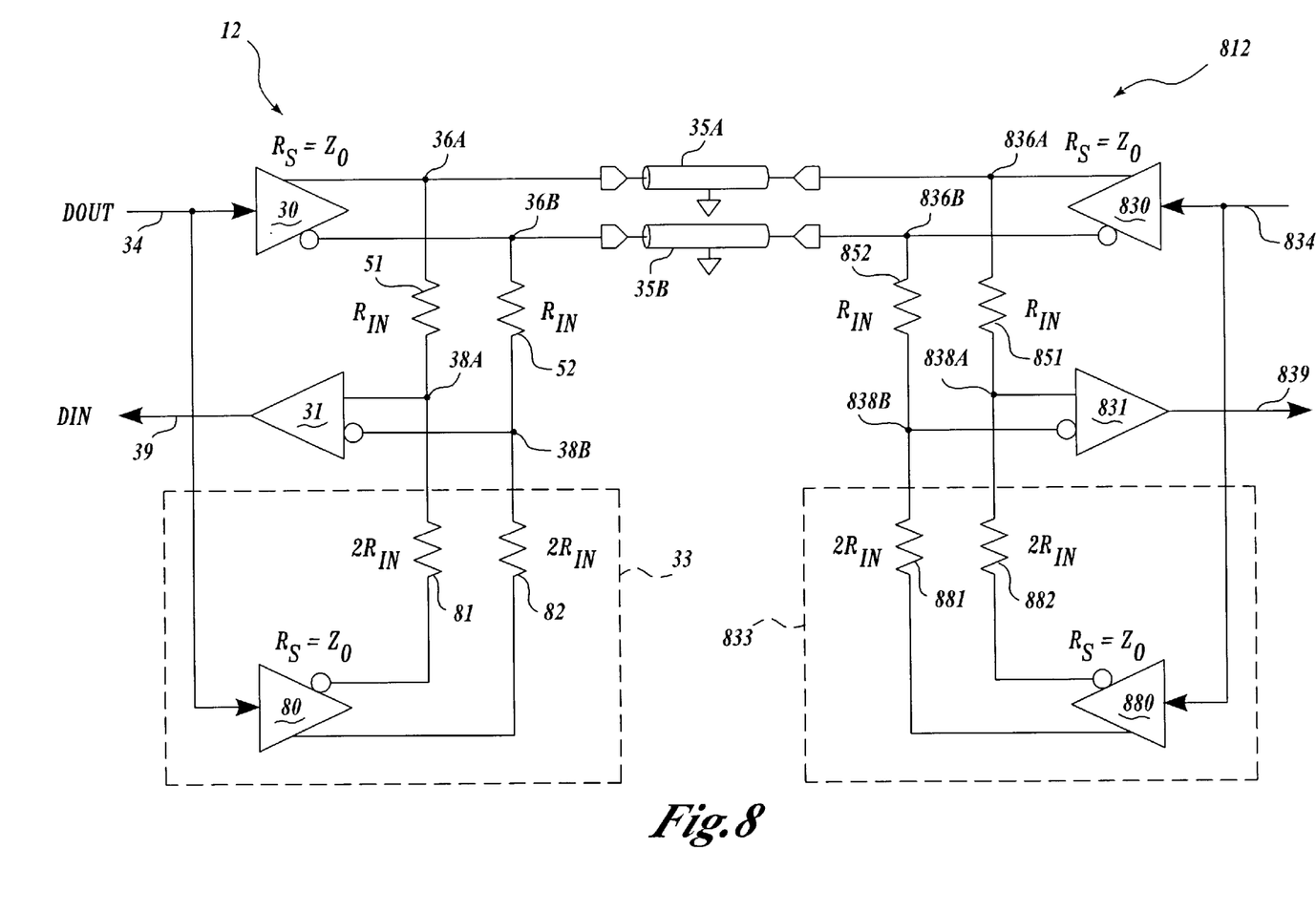
FIG. 8 is a schematic diagram illustrating a differential bi-directional signaling system, according to an embodiment of the present invention.

FIG. 8 schematically illustrates an implementation of driver/receiver circuit 12, according to yet another embodiment of the present invention. In particular, FIG. 8 shows the other driver/receiver circuit (i.e., a driver/receiver circuit 812). In this embodiment, driver/receiver circuit 12 is substantially similar to the embodiment of driver/receiver circuit 12 (FIG. 6) except for the offset generator. In this embodiment, offset generator 33 includes a differential driver 80 (matched to differential driver 30) and resistors 81 and 82. In one embodiment, resistors 81 and 82 each have a resistance that is ideally twice that of resistor 51 (i.e., $2R_{IN}$). Thus, resistors 51 and 81 form a simple one-third/two-thirds voltage divider with respect to internal node 38A. Likewise, resistors 52 and 82 form a simple one-third/two-thirds voltage divider with respect to internal node 38B.

Differential driver 80 has its input lead connected to line 34 to receive output signal DOUT, its positive (i.e., non-inverting) and negative (i.e., inverting) output leads connected to resistors 82 and 81, respectively. The other terminals of resistors 82 and 81 are connected to nodes 38B and 38A, respectively.

Driver/receiver circuit 812 is essentially identical to driver/receiver 12 as shown in FIG. 8, except that input signal DIN for driver/receiver circuit 12 serves as the output signal from driver/receiver circuit 812 and, similarly, output signal DOUT for driver/receiver circuit 12 serves as the input signal for driver/receiver circuit 812. As shown in FIG. 8, all of the elements of driver/receiver circuit 812 have corresponding elements in driver/receiver circuit 12 (found by deleting the leading "8" of the elements of driver/receiver circuit 812) that are interconnected in a like-manner.

In operation, in response to the logic level of output signal DOUT, differential amplifier 80 will drive the voltages at nodes 38A and 38B in the opposite direction that differential driver 30 drives these voltages. For example, in this embodiment, if output signal DOUT is at a logic one level, differential driver 30 will tend to pull up the voltage at internal node 38A to VCC while tending to pull down the voltage at internal node 38B to ground. Conversely, differential driver 80 will simultaneously tend to pull down the voltage at internal node 38A to ground while tending to pull up the voltage at internal node 38B to VCC. Driver 30 is driving against the matched impedance of driver 830 and thus only develops a voltage of −½VCC on signals 35A and 35B. Driver 80 is not loaded in this manner and thus develops an output swing that is close to VCC, but is coupled to nodes 38A and 38B through twice the resistance as the coupling from nodes 35A and 35B. As a result, the voltages generated at nodes 38A and 38B by differential drivers 30 and 80 approximately cancel one another, leaving the differential voltage driven by differential driver 830. Because of the resistor divider formed by resistors 51 and 81, and the resistor divider formed by resistors 52 and 82, the differential signal driven by differential driver 830 is attenuated by before it is received by differential receiver 31. Similarly, if output signal DOUT is at a logic zero level, differential driver 30 will tend to pull down the voltage at internal node 38A to ground while tending to pull up the voltage at internal node 38B to VCC. Conversely, differential driver 80 will simultaneously tend to pull up the voltage at internal node 38A to VCC while tending to pull down the voltage at internal node 38B to ground. As a result, the voltages driven at nodes 38A and 38B by differential driver 30 and differential driver 80 approximately cancel one another, leaving the voltage swing generated by differential driver 830.

Accordingly, there is a voltage swing of about VCC at internal nodes 38A and 38B for the various combinations of input signal DIN and signal DOUT logic levels. Table 4 below indicates, from the point of view of driver/receiver circuit 12, the voltage levels present on transmission lines 35A and 35B and internal nodes 38A and 38B for various values of signals DOUT and DIN. Driver/receiver circuit 812 operates in the same manner, except that output signal DOUT and input signal DIN with respect to driver/receiver circuit 12 respectively serve as the input and output signals of driver/receiver circuit 812.

TABLE 4

| DOUT | DIN | $V_{LINE\ 35A}$ | $V_{LINE\ 35B}$ | $V_{NODE\ 38A}$ | $V_{NODE\ 38B}$ |
| --- | --- | --- | --- | --- | --- |
| 0 | 0 | 0 | VCC | VCC | VCC |
| 0 | 1 | ½VCC | ½VCC | VCC | VCC |
| 1 | 0 | ½VCC | ½VCC | VCC | VCC |
| 1 | 1 | VCC | 0 | VCC | VCC |

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A circuit comprising:

a first differential driver having an input lead coupled to receive an output signal, the first differential driver to provide a differential output signal to be propagated on a set of differential signal lines;

an isolation circuit coupled to the set of differential signal lines;

a differential receiver having first and second input leads coupled to the differential signal lines through the isolation circuit, the differential receiver to detect a differential input signal propagated on the set of differential signal lines simultaneously with the differential output signal; and an offset generator having an input lead and first and second output leads, the input and the first and second output leads of the offset generator respectively coupled to the input lead of the first differential driver, and the first and second input leads of the differential receiver, the offset generator to provide an offset signal to the differential receiver as a function of a logic level of the output signal.

2. The circuit of claim 1, wherein the isolation circuit comprises a set of resistive elements connected between the set of differential signal lines and the first and second input leads of the differential receiver.

3. The circuit of claim 1, wherein the offset generator comprises:

an inverter having an input lead and an output lead, the input lead of the inverter coupled to the input lead of the first differential driver;

a current source;

a first transistor coupled to the first input lead of the differential receiver, the input lead of the first differential driver, and the current source; and a second transistor coupled to the second input lead of the differential receiver, the output lead of the inverter, and the current source.

4. The circuit of claim 3, wherein the first and second transistors are field effect transistors with a common source, the common source coupled to the current source, and wherein the first transistor has a drain and gate respectively coupled to the isolation circuit and the input lead of the first differential driver, and the second transistor has a drain and gate respectively coupled to the isolation circuit and the output lead of the inverter.

5. The circuit of claim 3, wherein the current source comprises:

a reference generator; and a current mirror coupled to the reference generator, the current mirror to mirror a current conducted by the reference generator.

6. The circuit of claim 1, wherein the offset generator comprises:

an inverter having an input lead and an output lead, the input lead of the inverter coupled to the input lead of the first differential driver;

a first current source;

a first transistor of a first type, wherein the first transistor is coupled to the first input lead of the differential receiver, to the input lead of the first differential driver, and to the first current source;

a second transistor of the first type, wherein the second transistor is coupled to the second input lead of the differential receiver, to the output lead of the inverter, and to the first current source;

a second current source;

a third transistor of a second type, wherein the third transistor is coupled to the first input lead of the differential receiver, the input lead of the first differential driver, and the second current source; and a fourth transistor of the second type, wherein the fourth transistor is coupled to the second input lead of the differential receiver, the output lead of the inverter, and the second current source.

7. The circuit of claim 6, wherein the first and second transistors are field effect transistors with a common source, the common source coupled to the first current source, and wherein the first transistor has a drain and gate respectively coupled to the isolation circuit and the input lead of the first differential driver, and the second transistor has a drain and gate respectively coupled to the isolation circuit and the output lead of the inverter.

8. The circuit of claim 6, wherein the third and fourth transistors are field effect transistors with a common source, the common source of the third and fourth transistors being coupled to the second current source, and wherein the third transistor has a drain and gate respectively coupled to the isolation circuit and the input lead of the first differential driver, and the fourth transistor has a drain and gate respectively coupled to the isolation circuit and the output lead of the inverter.

9. The circuit of claim 6, wherein the first current source comprises:

a reference generator; and a first current mirror coupled to the reference generator, the first current mirror to mirror a current conducted by the reference generator.

10. The circuit of claim 9, wherein the second current source comprises a second current mirror coupled to the reference generator, the second current mirror to mirror the current conducted by the reference generator.

11. The circuit of claim 1, wherein the offset generator comprises:

a second differential driver having an input lead coupled to the input lead of the first differential driver, the second differential driver to output a differential offset signal dependent on the output signal;

a first resistive element coupled to propagate a first component signal of the differential offset signal to the first input lead of the differential receiver; and a second resistive element coupled to propagate a second component signal of the differential offset signal to the second input lead of the differential receiver.

12. The circuit of claim 11, wherein the isolation circuit comprises:

a third resistive element coupled to propagate a first component signal of the differential output signal to the first input lead of the differential receiver, the first resistive element having an impedance that is less than that of the first resistive element; and a fourth resistive element coupled to propagate a second component signal of the differential output signal to the second input lead of the differential receiver, the second resistive element having an impedance that is less than that of the second resistive element.

13. The circuit of claim 12, wherein the third and fourth resistive elements have impedances that are half that of the first and second resistive elements, respectively.

14. The circuit of claim 1, wherein the offset signal provided to the differential receiver by the offset generator has a polarity opposite that of the differential output signal.

15. A circuit comprising:

a first differential driver having an input lead coupled to receive an output signal, the first differential driver to provide a differential output signal to be propagated on a set of differential signal lines;

an isolation circuit coupled to the set of differential signal lines;

a differential receiver having first and second input leads coupled to the set of differential signal lines through the isolation circuit, the differential receiver to detect a differential input signal propagated on the set of differential signal lines simultaneously with the differential output signal; and offset means for providing a differential offset signal to the first and second input leads of the differential receiver, the differential offset signal generated as a function of a logic level of the output signal.

16. The circuit of claim 15, wherein the offset means comprises:

an inverter having an input lead and an output lead, the input lead of the inverter coupled to the input lead of the first differential driver;

a current source;

a first transistor coupled to the first input lead of the differential receiver, the input lead of the first differential driver, and the current source; and a second transistor coupled to the second input lead of the differential receiver, the output lead of the inverter, and the current source.

17. The circuit of claim 14, wherein the first and second transistors are field effect transistors with a common source, the common source coupled to the current source, and wherein the first transistor has a drain and gate respectively coupled to the isolation circuit and the input lead of the first differential driver, and the second transistor has a drain and gate respectively coupled to the isolation circuit and the output lead of the inverter.

18. The circuit of claim 14, wherein the current source comprises:

a reference generator; and a current mirror coupled to the reference generator, the current mirror to mirror a current conducted by the reference generator.

19. The circuit of claim 15, wherein the offset means comprises:

an inverter having an input lead and an output lead, the input lead of the inverter coupled to the input lead of the first differential driver;

a first current source;

a first transistor of a first type, wherein the first transistor is coupled to the first input lead of the differential receiver, to the input lead of the first differential driver, and to the first current source;

a second transistor of the first type, wherein the second transistor is coupled to the second input lead of the differential receiver, to the output lead of the inverter, and to the first current source;

a second current source;

a third transistor of a second type, wherein the third transistor is coupled to the first input lead of the differential receiver, the input lead of the first differential driver, and the second current source; and a fourth transistor of the second type, wherein the fourth transistor is coupled to the second input lead of the differential receiver, the output lead of the inverter, and the second current source.

20. The circuit of claim 19, wherein the first and second transistors are field effect transistors with a common source, the common source coupled to the first current source, and wherein the first transistor has a drain and gate respectively coupled to the isolation circuit and the input lead of the first differential driver, and the second transistor has a drain and gate respectively coupled to the isolation circuit and the output lead of the inverter.

21. The circuit of claim 19, wherein the third and fourth transistors are field effect transistors with a common source, the common source of the third and fourth transistors being coupled to the second current source, and wherein the third transistor has a drain and gate respectively coupled to the isolation circuit and the input lead of the first differential driver, and the fourth transistor has a drain and gate respectively coupled to the isolation circuit and the output lead of the inverter.

22. The circuit of claim 19, wherein the first current source comprises:

a reference generator; and a first current mirror coupled to the reference generator, the first current mirror to mirror a current conducted by the reference generator.

23. The circuit of claim 22, wherein the second current source comprises a second current mirror coupled to the reference generator, the second current mirror to mirror the current conducted by the reference generator.

24. The circuit of claim 15, wherein the offset means comprises:

a second differential driver having an input lead coupled to the input lead of the first differential driver, the second differential driver to output a differential offset signal dependent on the output signal;

a first resistive element coupled to propagate a first component signal of the differential offset signal to the first input lead of the differential receiver; and a second resistive element coupled to propagate a second component signal of the differential offset signal to the second input lead of the differential receiver.

25. The circuit of claim 24, wherein the isolation circuit comprises:

a third resistive element coupled to propagate a first component signal of the differential output signal to the first input lead of the differential receiver, the first resistive element having an impedance that is less than that of the first resistive element; and a fourth resistive element coupled to propagate a second component signal of the differential output signal to the second input lead of the differential receiver, the second resistive element having an impedance that is less than that of the second resistive element.

26. The circuit of claim 15, wherein the differential offset signal provided to the differential receiver by the offset means has a polarity opposite that of the differential output signal.

27. A method, comprising:

receiving an output signal;

driving a differential output signal on differential signal lines as a function of the output signal, said differential input signal being simultaneously driven on the differential signal lines;

generating an offset voltage as a function of a logic level of the output signal; and generating an input signal as a function of the offset voltage and voltages of the differential signal lines.

28. The method of claim 27, wherein generating an offset voltage comprises:

generating a reference current;

generating a first current that is proportional to the reference current; and conducting the first current through a first resistive element, wherein a voltage drop across the first resistive element contributes at least in part to the offset voltage.

29. The method of claim 28, further comprising:

generating a second current that is proportional to the reference current; and conducting the second current through a second resistive element, wherein a voltage drop across the second resistive element contributes at least in part to the offset voltage.

30. An apparatus, comprising:

means for driving a differential output signal on differential signal lines as a function of an output signal logic level, said differential input signal being simultaneously driven on the differential signal lines;

means for generating an offset voltage as a function of the output signal logic level; and means for generating an input signal having a logic level as a function of the offset voltage and voltages of the differential signal lines.

31. The apparatus of claim 30, wherein the means for generating an offset voltage comprises:

means for generating a reference current;

means for generating a first current that is proportional to the reference current; and a first resistive element coupled to conduct the first current, wherein a voltage drop across the first resistive element contributes at least in part to the offset voltage.

32. The apparatus of claim 31, further comprising:

means for generating a second current that is proportional to the reference current; and a second resistive element coupled to conduct the second current, wherein a voltage drop across the second resistive element contributes at least in part to the offset voltage.

* * * * *